United States Patent [19]
Wong

[11] Patent Number: 5,884,925
[45] Date of Patent: Mar. 23, 1999

[54] SOLID AXLE SUSPENSION FOR VEHICLES

[75] Inventor: Jason Michael Wong, Sterling Heights, Mich.

[73] Assignee: General Motors Corporation, Detroit, Mich.

[21] Appl. No.: 42,958

[22] Filed: Mar. 17, 1998

[51] Int. Cl.[6] .................................................. B60G 1/00
[52] U.S. Cl. ........................ 280/124.106; 280/124.103; 280/124.1
[58] Field of Search ...................... 280/124.1, 124.106, 280/124.103, 124.107

[56] References Cited

U.S. PATENT DOCUMENTS

| | | | |
|---|---|---|---|
| 3,785,672 | 1/1974 | Shakespear | 280/124.106 |
| 4,278,270 | 7/1981 | Fry | 280/124.106 |
| 5,566,969 | 10/1996 | Tattermusch | 280/124.1 |
| 5,758,898 | 6/1998 | Gordon et al. | 280/124.106 |

*Primary Examiner*—Christopher P. Ellis
*Attorney, Agent, or Firm*—Jeffrey A. Sedlar

[57] ABSTRACT

A solid axle is laterally positioned by a pan-hard rod. The fore, aft and vertical position of the axle is controlled by a combination of a windup link and a canted position link. The position link is attached to the body or frame of the vehicle at one of its ends and at its other end it is attached to the windup link. One end of the windup link is attached to the axle and the other is attached to the vehicle body or frame. The geometric relationship between the windup link and the position link determine the ride and roll motion of the axle and the wheel centers. Advantageously, the unique arrangement of the windup link and position link effect a roll steer characteristic that is independent of side view wheel path motion.

10 Claims, 2 Drawing Sheets

SOLID AXLE SUSPENSION FOR VEHICLES

TECHNICAL FIELD

The present invention relates to solid axle suspensions for vehicles and more particularly, to a multi-link rear-wheel suspension for a vehicle's solid axle that provides a roll steer characteristic that is decoupled from the side view wheel path resulting from ride motion.

BACKGROUND OF THE INVENTION

The rear axles of vehicles can generally be classified as independent, twist or solid. With a solid axle the two rear-wheels of a vehicle are connected together with some form of a rigid beam, bar or tube so that when one of the wheels encounters an irregularity in the road surface the other wheel is also affected. This type of construction gives rise to the terminology: solid axle suspension. In the usual case, this type of axle is found at the rear of a rear-wheel drive vehicle and is therefore a live axle, meaning that the attached wheels are driven through a connected drive shaft from the vehicle's engine. With a typical solid axle suspension such as the conventional five-link type, roll steer characteristics are effected by the side view wheel path motion. Side view wheel path motion generally influences the steering motion of the axle and thus, the wheels with respect to the vehicle's body during roll motion. This is because the fore-aft location of the wheel relative to the body can change as the suspension system deflects in jounce and rebound motions. As changes occur in the fore-aft location of the wheels during body roll, one wheel jounce, and one wheel rebound, roll steer is imparted to the axle. The effects can induce vehicle understeer or oversteer. Preferably roll steer characteristics that are imparted to a vehicle's body would be independent of side view wheel path motion.

SUMMARY OF THE INVENTION

An aspect of the present invention resides in providing a solid axle suspension that provides a roll steer characteristic that is independent of side view wheel path motion. This means that the wheel path for ride is independent from the wheel path for a roll. In achieving this aspect, the invention uses a solid axle that is preferably live and that is laterally positioned by a pan-hard rod. The fore, aft and vertical position of the axle is controlled by a windup link and a position link combination. The geometric relation between the windup link and the position link determines the ride and roll motion of the axle and the wheel centers. The position link is attached to the body or frame of the vehicle at one of its ends and at its other end it is attached to the windup link. The attachment at each end of the position link requires a pivoting structure such as a bushing or ball joint. One end of the windup link is attached to the axle and the other is attached to the vehicle body or frame. The vehicle body or frame connection of the windup link requires a device that allows fore and aft motion, preferably by employing a device such as an intermediate link (i.e. shackle), or some type of slider mechanism or voided bushing. The axle connection of the windup link requires a fairly rigid connecting device.

The windup link provides windup stiffness in the suspension system during vehicle operation and also preferably functions as a twist element. In controlling action of the suspension and movement of the sprung mass relative to the unsprung mass, the windup link and position link control axle movement in a more linear motion from the side view than is conventionally achieved. The linearity of the path is a function of position and geometry of both the windup link and the position link. The lengths of the individual links in the suspension system are dictated by the packaging requirements and wheel travel requirements for the given application. Preferably, the suspension utilizes coil springs between the axle and the body. Advantageously, the unique arrangement of the windup link and position link effect a roll steer characteristic that is independent of side view wheel path motion.

DESCRIPTION OF THE PREFERRED EMBODIMENT

In designing a vehicle suspension system, a roll steer characteristic can be used to impart understeer or oversteer to the vehicle in certain roll situations. In some roll situations, it is desirable to impart understeer. If roll steer is effected by side view wheel path motion then the designed in roll imparted steer is limited. For the present invention, the roll steer performance is independent of side view wheel path motion and results in roll imparted understeer characteristics in certain desirable situations and at various loading conditions of the vehicle.

Figure 1:
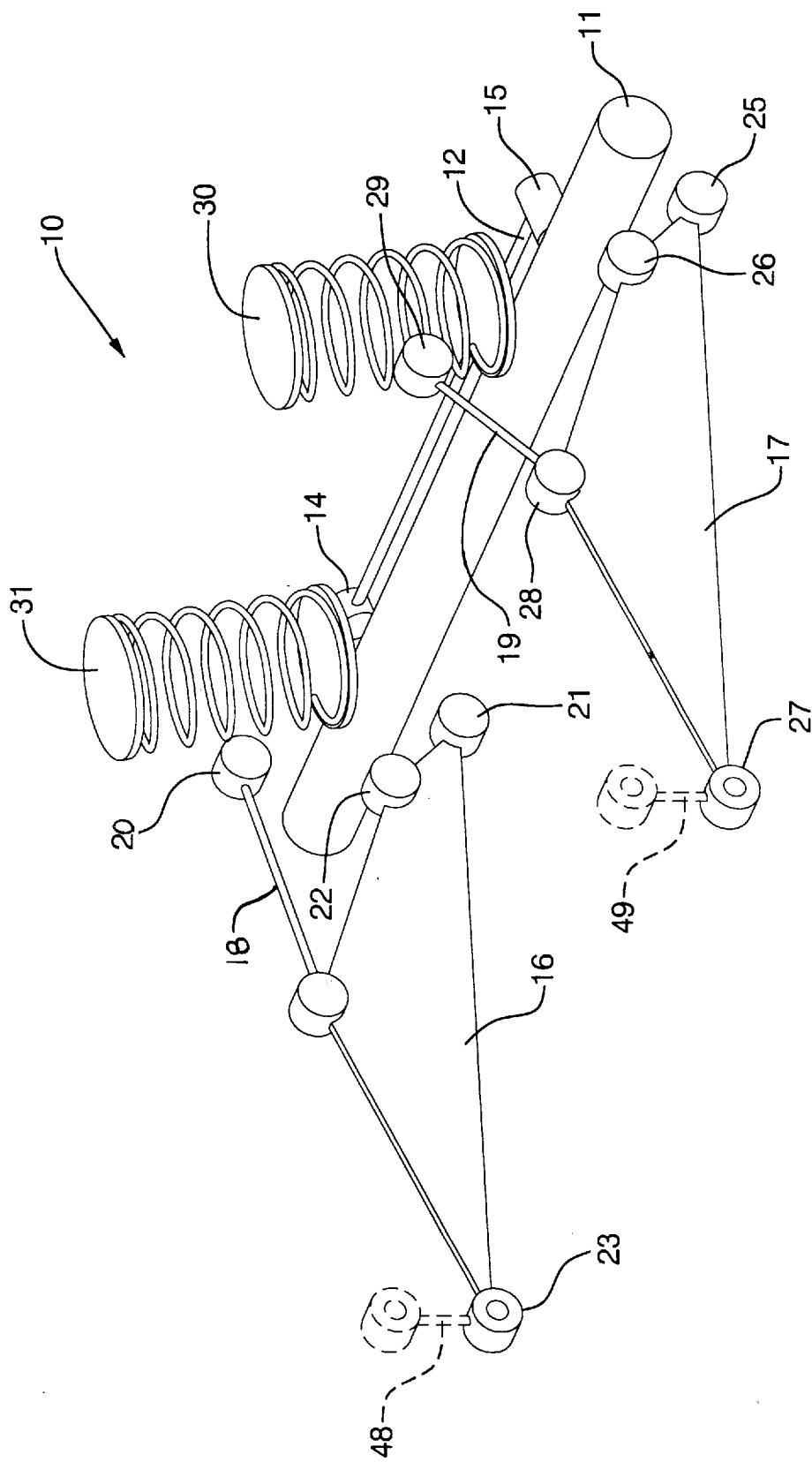
FIG. 1 is a schematic perspective view of a preferred embodiment of a solid axle suspension according to the present invention.

Referring to FIG. 1, a layout of the suspension system is illustrated and is designated generally as 10. The solid axle 11 is positioned laterally by a panhard rod 12 that is also known as a track bar. The panhard rod 12 has a bushing 14 at one end that is connected to the vehicle body or frame and a bushing 15 at its other end that is connected to the axle 11. The fore, aft and vertical position of the axle 11 is controlled by the windup links 16 and 17 and the canted position links 18 and 19. The windup link 16 is connected to the axle 11 through a voided bushing 21 and a voided bushing 22, and is positioned generally fore-aft relative to the vehicle. The voided bushing 23 of windup link 16 is connected to the frame or body of the associated vehicle. Optionally, an additional link 48 is positioned between the voided bushing 23 and the frame or body to allow additional fore-aft movement. The position link 18 includes a bushing 24 that is connected to the windup link 16 and a bushing 20 that is connected to the frame or body of the associated vehicle. Windup link 17 is connected to the axle 11 through a voided bushing 25 and a voided bushing 26. The windup link 17 includes a voided bushing 27 that is connected to the frame or body of the associated vehicle, and is positioned generally fore-aft relative to the vehicle. Optionally, an additional link 49 is positioned between the voided bushing 27 and the frame or body to allow additional fore-aft movement. The position link 19 is connected to the windup link 17 through bushing 28 and is connected to the frame or body of the associated vehicle through bushing 29. The suspension system 10 also includes a pair of coil spring assemblies 30 and 31 that extend between the axle 11 and the frame or body of the associated vehicle.

Figure 2A:
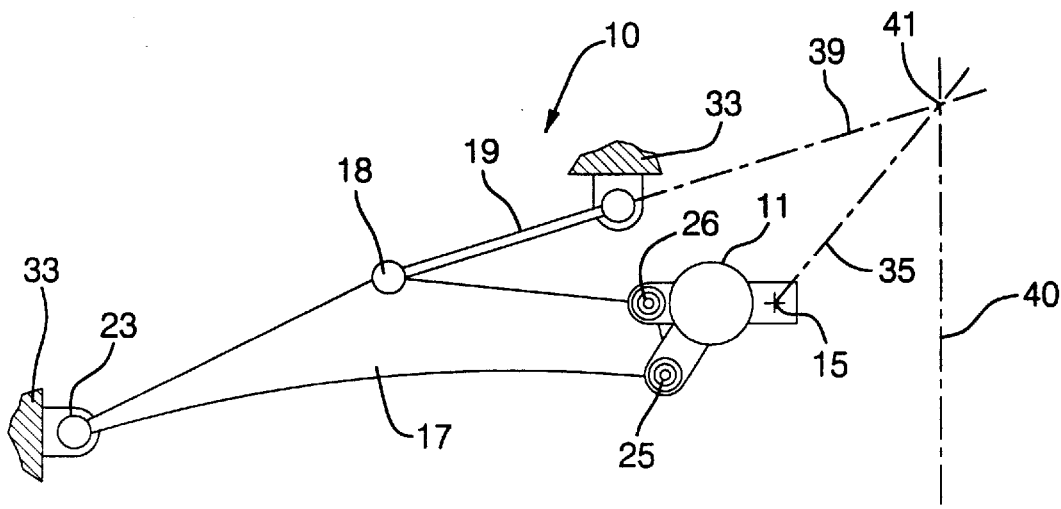
FIGS. 2A, 2B shows both a top and side view of the solid axle suspension system of FIG. 1, showing the link relationships and the defined roll axis.
Figure 2B:
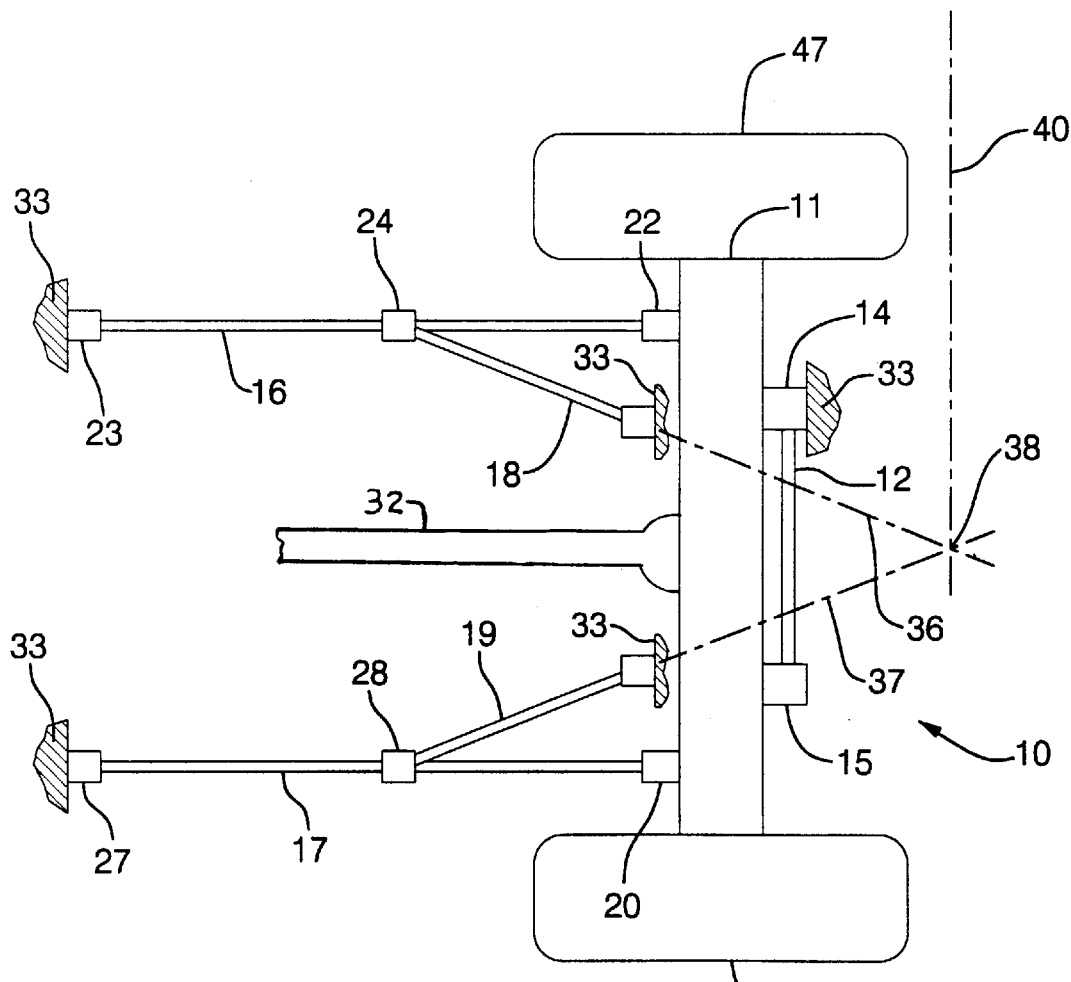

Referring to FIGS. 2A and 2B, the components of the vehicle suspension system 10 are identified by the same reference numerals used in FIG. 1. It is apparent in FIG. 2B that the axle 11 is live through the connected drive shaft 32. The frame or body of the associated vehicle is identified by reference numeral 33 in FIGS. 2A and 2B. The suspension system is shown with the connections between the various links and the vehicle body/frame completed. The wheels 46 and 47 are also shown. As illustrated in FIG. 1 the windup link is substantially triangular, but as shown in FIG. 2A, the windup link can take other forms with its three connecting points (axle attachment assumed at one point). The three connecting points may also be on the same line and on different planes.

The combination of a top and side view of the suspension system 10 show the defined roll axis 35. With both the top and side views aligned vertically in FIGS. 2A and 2B, extending lines 36 and 37 are drawn from the position links 18 and 19 in the top view of FIG. 2B defining a point 38 where they intersect. In the side view of FIG. 2A, an extending line 39 is drawn from the position link 19 and a vertical line 40 is drawn from the point 38 parallel to the axle 11 until it intersects line 39 at point 41. A line is then extended between the point 41 and the center of the pan-hard rod 12 defining the roll axis 35. The roll axis 35 and the suspension system 10 in operation, result in understeer characteristics at both two passenger and gross vehicle weight loading of the associated vehicle. A low fore/aft wheel center stiffness is also achieved for the suspension system 10. For example, the average left to right stiffness is approximately two-thirds that of a comparable conventional five-link suspension system.

I claim:

1. A suspension system comprising:
    an axle extending between a pair of wheels wherein the axle is substantially rigid so that a road input experienced at one wheel imparts a response at the other wheel;
    a vehicle body suspended relative to the wheels by the suspension system;
    a windup link positioned generally in a fore-aft orientation and having a first end connected to the body and a second end connected to the axle wherein at least one of the first end and second end includes an intermediate connector that allows restricted relative fore and aft movement between the axle and the body; and
    a position link disposed at an angle relative to the axle and connected between the windup link and the body wherein fore and aft position of the axle relative to the body is controlled by the windup link and the position link.

2. A suspension system according to claim 1 further comprising a panhard rod connected between the axle and the body wherein the panhard rod controls lateral position of the axle relative to the body.

3. A suspension system according to claim 1 wherein the intermediate connector is located at an interface between the windup link and the body and enable relative fore and aft movement.

4. A suspension system according to claim 1 wherein the windup link is connected to the axle, the body and the position link at three points.

5. A suspension system according to claim 1 further comprising a second position link wherein the roll axis of the suspension system is defined from a point at which two lines extended from the position links intersect.

6. A suspension system comprising:
    an axle assembly extending between a first wheel and a second wheel wherein the axle assembly is substantially rigid so that a road input experienced at one wheel imparts a response at the other wheel;
    a vehicle body suspended relative to the wheels by the suspension system;
    a first windup link positioned near the first wheel and generally fore-aft relative to the vehicle body and having a first end connected to the body and a second end connected to the axle assembly wherein at least one of the first end and second end includes an intermediate connector that allows restricted relative fore and aft movement between the axle assembly and the body;
    a second windup link positioned near the second wheel and positioned generally for-aft relative to the vehicle body and having a first end connected to the body and a second end connected to the axle assembly wherein at least one of the first end and second end includes an intermediate connector that allows restricted relative fore and aft movement between the axle assembly and the body;
    a first position link disposed at an angle relative to the axle assembly and connected between the first windup link and the body;
    a second position link disposed at an angle relative to the axle assembly and connected between the second windup link and the body; and
    a panhard rod connected between the axle assembly and the body and extending substantially between the first wheel and the second wheel.

7. A suspension system according to claim 6 wherein the first and second windup links are each connected to the axle assembly, the body and the corresponding position link at three points.

8. A suspension system according to claim 6 wherein a roll axis of the suspension system is defined from a point defined where a line extended from the first position link intersects a line extended from the second position link.

9. A suspension system according to claim 6 further comprising a drive shaft connected to the axle assembly.

10. A suspension system comprising:
    an axle assembly extending between a first wheel and a second wheel wherein the axle assembly is substantially rigid so that a road input experienced at one wheel imparts a response at the other wheel;
    a vehicle body suspended relative to the wheels by the suspension system;
    a first windup link positioned near the first wheel, substantially triangular in shape, and positioned generally fore-aft relative to the body and having a first end connected to the body and a second end connected to the axle assembly wherein the first end includes a connector that allows restricted relative fore and aft movement between the axle assembly and the body;
    a second windup link positioned near the second wheel, substantially triangular in shape, and positioned generally fore-aft relative to the body and having a first end connected to the body and a second end connected to the axle assembly wherein the first end includes a connector that allows restricted relative fore and aft movement between the axle assembly and the body;
    a first position link disposed at an angle relative to the axle assembly and connected between the first windup link and the body;
    a second position link disposed at an angle relative to the axle assembly and connected between the second windup link and the body; and
    a panhard rod connected between the axle assembly and the body and extending substantially between the first wheel and the second wheel.

* * * * *